Aug. 26, 1924.
1,506,623
J. C. FLICKINGER
DISK BRAKE
Filed Oct. 30, 1923    3 Sheets-Sheet 1
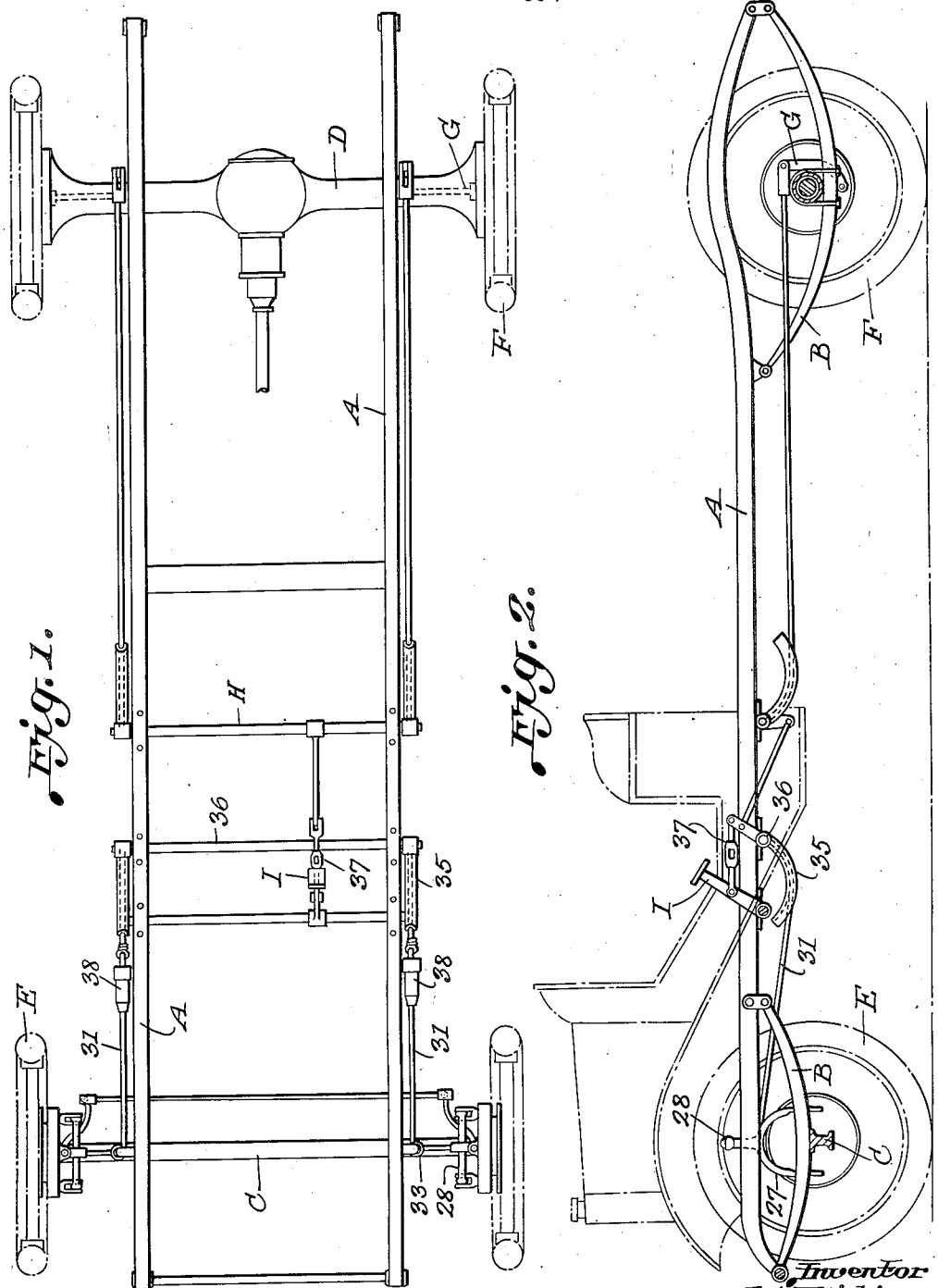
Inventor
J. C. Flickinger
by his Attorneys
Baldwin Wight Aug. 26, 1924.
1,506,623
J. C. FLICKINGER
DISK BRAKE
Filed Oct. 30, 1923  3 Sheets-Sheet 2
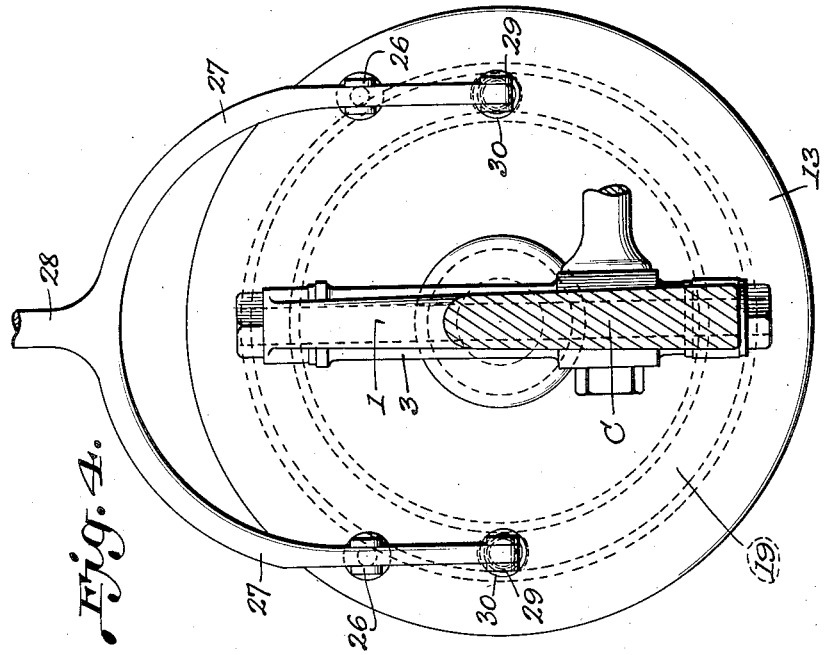
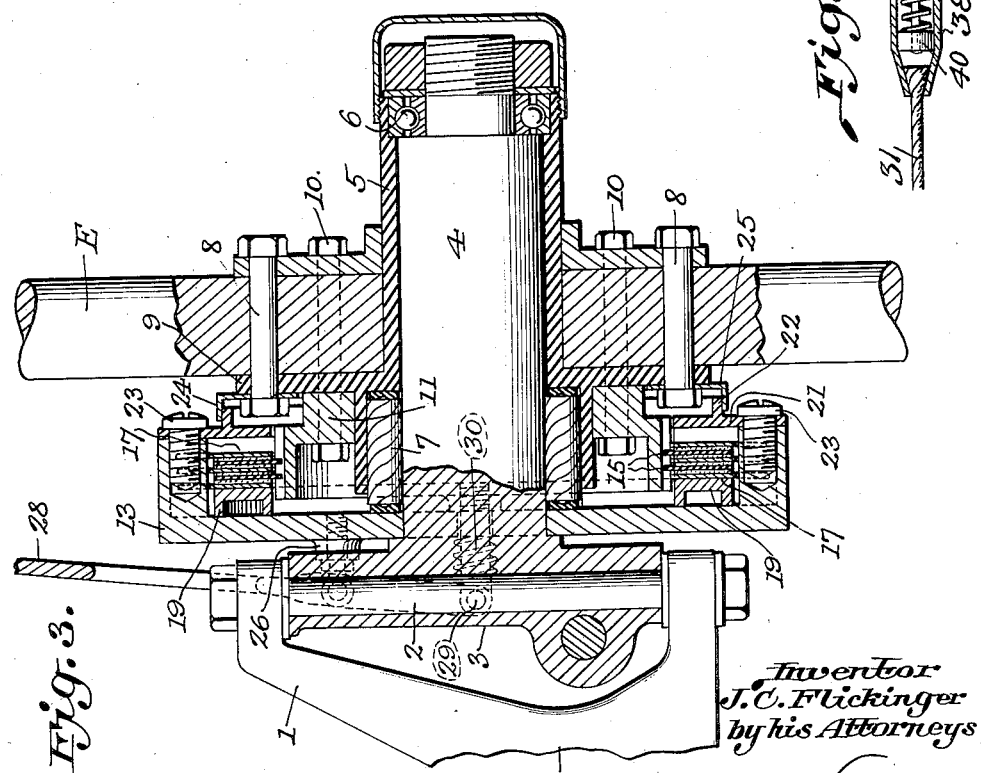
Inventor
J. C. Flickinger
by his Attorneys
Baldwin Wight

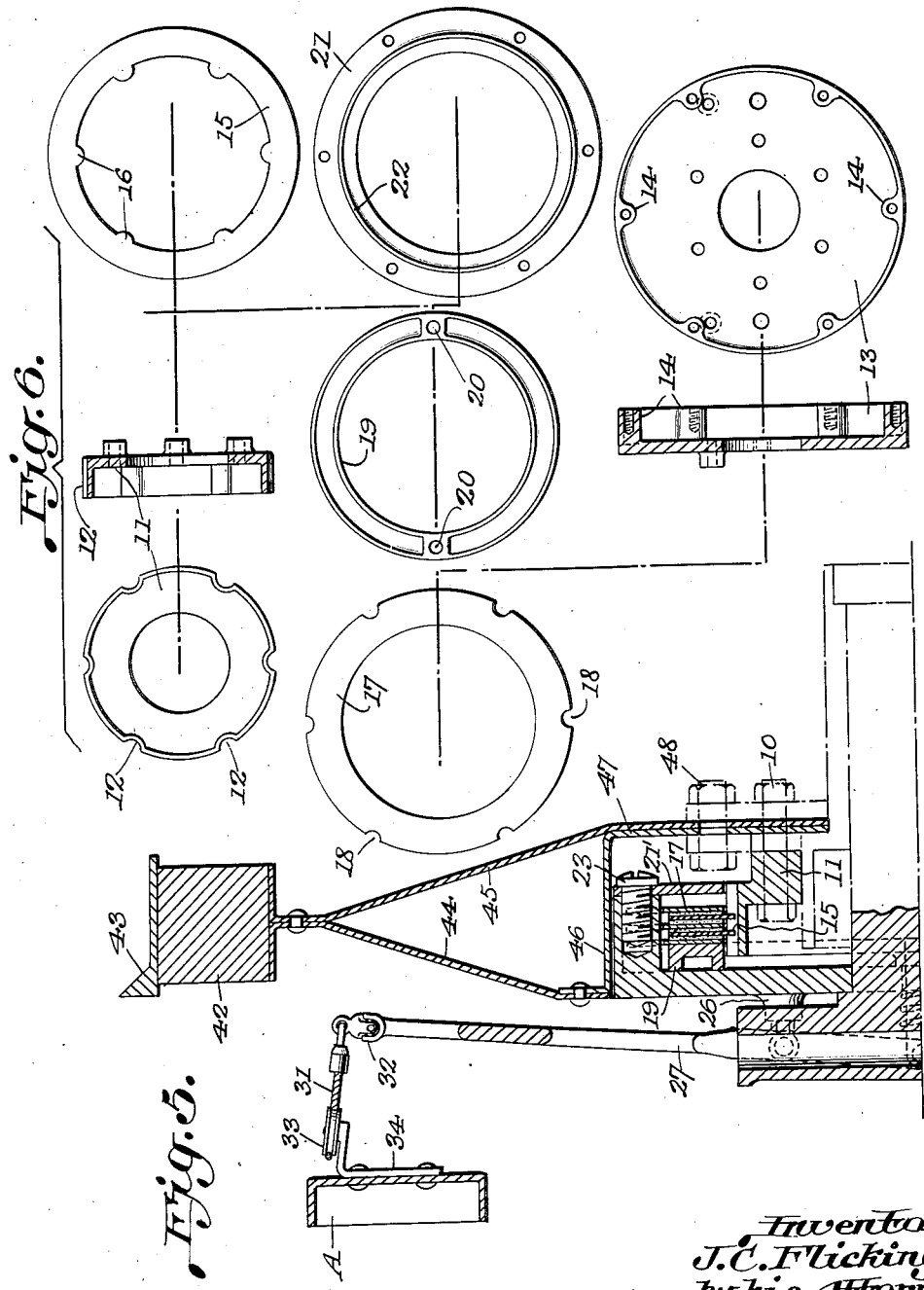

Patented Aug. 26, 1924.

1,506,623

UNITED STATES PATENT OFFICE.

JOHN C. FLICKINGER, OF LEHIGHTON, PENNSYLVANIA, ASSIGNOR OF ONE-HALF TO JOHN A. ENGESSER, OF MAUCH CHUNK, PENNSYLVANIA.

DISK BRAKE.

Application filed October 30, 1923. Serial No. 671,783.

*To all whom it may concern:*

Be it known that I, JOHN C. FLICKINGER, a citizen of the United States, and resident of Lehighton, in the county of Carbon and State of Pennsylvania, have invented certain new and useful Improvements in Disk Brakes, of which the following is a specification.

My invention relates to an improved form of disk brake for the wheels of an automobile and can be applied to either the front or rear wheels or both.

An object of the invention is to provide a brake of the disk type that will be simple and efficient in use and in which the power may be readily applied.

A further object of the invention is the provision of a disk brake in which the working parts are protected from dust and dirt.

Another object is the provision of means whereby the braking pressure may be applied irrespective of the turning of the front wheels, notwithstanding that part of the brake is carried by the wheels.

Other objects will be apparent from the following detailed description and the appended claims.

In the drawings:

Figure 1 is a top plan view of a chassis with my invention applied thereto showing the general arrangement of brakes and operating means therefor.

Figure 2 is a side elevation of the parts shown in Figure 1.

Figure 3 is a vertical section through a portion of the wheel and stub axle with the brake applied.

Figure 4 is a side elevation with parts in section.

Figure 5 is a view similar to Figure 3 but of a modified form.

Figure 6 is a collective view in elevation and section of the various disk elements comprising the brake.

Figure 7 is a sectional view of a spring connection that may be interposed in the operating connections to the brake.

My invention may be applied to an automobile of any desired type such as illustrated in Figures 1 and 2, comprising a chassis having side bars A, springs B, front axle C, rear axle D, front wheels E, and rear wheels F, all of which may be of any suitable character. Preferably my improved brake will be applied to the front wheels only and the rear wheels will be braked by brakes G of any usual type operated by connections from a rock shaft H which in turn is connected to be actuated from a pedal I.

The front axle C has the usual fork 1 in which is mounted the spindle 2 which supports the spindle sleeve 3 for movement, this being preferably integral with the wheel spindle 4. A flanged bushing 5 is mounted to turn on the axle 4 and ball bearings 6 and roller bearings 7 may be employed to facilitate its turning movement. Bolts 8 clamp the flange 9 of this bushing to the front wheel E.

Fastened to the hub of the wheel by bolts 10 which pass through the wheel and the flange 9 is an inner drum or annular member 11, shown in face and section in Figure 6. The flanged rim of this drum is provided with a plurality of depressions 12. An outer drum or annular member 13 is mounted on the spindle 4 and is held against rotation thereon. The inner periphery of the flange of this drum is provided with ears or projections 14. These two drums are concentric and the outer drum is considerably larger than the inner leaving an annular space between the two. In this space is mounted a plurality of friction disks which will now be described.

The disks 15 are preferably steel and are provided with inwardly extending projections 16 which fit into the depressions 12 in the inner drum 11 so that these disks are compelled to turn with the inner drum and wheel. Disks 17 having a lining or facing of friction material on one or both sides as shown in the drawings are provided with depressions 18 into which fit the ears 14 of the outer drum 13, thereby holding the disks 17 against rotation. A pressure ring 19 lies between the drum 13 and the outer disk 17 and has two openings 20 diametrically opposite for a purpose hereinafter set forth. A stop ring 21 provided with a flange 22 on its outside is fastened to the drum 13 by screws 23 which pass through the stop ring and are threaded into the flange of the drum 13. Dust rings 24 of a size corresponding to that of the other elements are fastened to the wheel by the bolts 8 and have an outer rim 25 which fits closely against the flange 22 of the stop ring 21 and thereby prevents mud and dirt from getting into the brake.

Fitting into openings tapped into the outer drum 13 are studs 26 which serve as fulcrums for the branches 27 of a yoke 28, these branches being pivoted to the studs 26 in any desired manner. To the lower ends of these branches 27 are pivoted pins 29 which are tapped into the openings 20 in the pressure ring 19. Springs 30 normally press the pins outwardly and therefore tend to release the pressure of the ring 19 on the friction disks when the operating pressure is released. It is understood that the space between the pressure ring 19 and the stop ring 21 will be substantially filled with the friction disks 15 and 17 so that the moment pressure is applied to the pressure ring 19 the braking action begins.

Motion may be transmitted to the operating yoke 28 in various ways. As illustrated, a cable 31 is fastened to the upper end of the yoke 28 by a universal joint 32, the particular character of which is unimportant, and it may be a ball and socket joint or any other equivalent form. It is important that a universal joint of some form be used since the brake can then be applied regardless of the angular position of the front wheels relative to the vehicle. This cable 31 passes about a pulley 33 carried by a bracket 34 affixed to the side bar A of the chassis, and passes rearwardly to a curved guide 35 attached to a shaft 36 which is rocked from the pedal I by connections 37. From an examination of Figure 2 it is obvious that when the pedal I is operated, the curved guide 35 will swing downwardly and rearwardly pulling on the cable 31, rocking the yoke 28 and pressing the pressure ring 19 against the friction disks, thus braking the wheel. It is to be noted that the drum 13, the disks 17 and the stop ring 21 are all stationary, while the drum 11 and the friction disks 15 revolve with the wheel. When the pressure on the pedal is released, the springs 30 release the brake.

There may be interposed in the cables 31 at any desired point as indicated in Figure 1, compensating mechanism of the form disclosed in Figure 7. The cable is made in two parts and to one end is attached a short cylinder 38 having a cap 39 provided with a central opening. The other end of the cable passes through this opening and is attached to a block 40 between which and the cap is compressed a spring 41. The purpose of this is to permit the rear brakes to be applied with some considerable force before the front brakes can be applied with sufficient force to block the wheels.

Figure 5 shows the brake applied to a special form of disk or semi-disk wheel made of sections of wood and steel. This has a wooden rim 42 with a steel tire band 43 and is formed of sections 44, 45 and 46, as illustrated, the latter having a flange 47 bent parallel to the inner part of the member 45 and fastened thereto by bolts 48. In this form of the wheel, the elements of the brake mechanism will be as above described, except that the stop ring 21' does not have any external flange and the dust ring 24 may be entirely omitted, since the parts 45 and 47 of the wheel inclose the brake mechanism and protect it from dust and dirt. In all other respects the brake mechanism is the same as that disclosed with reference to Figure 3.

It will be seen that I have produced a very efficient front brake of the disk type which is inclosed and is readily operated from the usual brake pedal which operates the rear brakes. It can of course be operated by a separate pedal or lever if desired. Obvious variations and changes may be made without in any way departing from the scope of the invention which is to be regarded as limited only by the scope of the appended claims.

I claim as my invention:

1. A disk brake for automobiles comprising an inner drum, attached to a wheel, an outer stationary drum, a stop ring attached thereto, a movable pressure ring, friction disks, between the two rings, an operating member pivoted on the outer drum, pins pivoted to said member and fast to the pressure ring whereby movement of the operating member will compress the friction disks against the stop ring.

2. A disk brake for automobiles comprising an inner drum attached to a wheel, an outer stationary drum, a stop ring attached thereto, a movable pressure ring, friction disks between the two rings, an operating member pivoted on the outer drum, and means connecting the operating member directly to the pressure ring.

3. A disk brake for automobiles comprising an inner drum attached to a wheel, an outer stationary drum, a stop ring attached thereto, an annular pressure member lying wholly between the two drums, friction disks between said ring and said pressure member, an operating member pivoted on the outer drum, and means passing through the outer drum to connect the operating member to the pressure member.

4. A disk brake for automobiles comprising an inner drum attached to a wheel, an outer drum stationary on a stub axle, a stop ring attached to the outer drum, a movable pressure ring lying wholly between the two drums, friction disks between the two rings, and operating means pivoted to the stationary drum and connected to the pressure ring to give it sliding movement but hold it against rotation.

In testimony whereof, I have hereunto subscribed my name.

JOHN C. FLICKINGER.